US005818328A

United States Patent [19]
Anderson et al.

[11] Patent Number: 5,818,328
[45] Date of Patent: *Oct. 6, 1998

[54] METHOD AND SYSTEM FOR PROVIDING IMPROVED WIRELESS AUDIO TRANSMISSION

[75] Inventors: Claudia Amelia Parry Anderson, Bluffdale; Jeffrey David Anderson, Riverton; Steven E. Bash, Orem, all of Utah

[73] Assignee: Audio Enhancement, Riverton, Utah

[21] Appl. No.: 725,571

[22] Filed: Oct. 3, 1996

Related U.S. Application Data

[60] Provisional application No. 60/004,794 Oct. 3, 1995.
[51] Int. Cl.$^6$ ..................................................... G08B 3/10
[52] U.S. Cl. ................... 340/384.72; 340/555; 359/142; 359/149; 359/152; 359/157; 359/159; 359/180; 359/186; 359/189; 379/56.3; 381/77; 381/79; 434/351; 455/66
[58] Field of Search ........................... 340/384.1, 384.72, 340/825.24, 825.25, 825.69, 825.72, 573, 555; 381/172, 168, 175, 2, 82, 187, 188, 77, 79, 110, 24; 359/142, 180, 149, 150, 157, 159, 189, 172, 152, 184, 185, 186; 455/88, 41, 66, 7, 8, 9, 11.1; 367/190; 379/38, 56.1, 56.2, 56.3; 434/350, 351, 362, 118

[56] References Cited

U.S. PATENT DOCUMENTS

| | | | |
|---|---|---|---|
| 3,927,316 | 12/1975 | Citta | 250/199 |
| 4,221,932 | 9/1980 | Anglikowski et al. | 179/2 EA |
| 4,224,482 | 9/1980 | Lese et al. | 179/157 |
| 4,882,773 | 11/1989 | Maloney | 455/617 |
| 4,899,388 | 2/1990 | Mlodzikowski et al. | 381/77 |
| 5,095,382 | 3/1992 | Abe | 359/189 |
| 5,199,080 | 3/1993 | Kimura et al. | 381/110 |
| 5,216,238 | 6/1993 | Yoshioka et al. | 250/214 |
| 5,218,641 | 6/1993 | Abe et al. | 381/79 |
| 5,226,090 | 7/1993 | Kimura | 381/110 |
| 5,247,580 | 9/1993 | Kimura et al. | 381/43 |
| 5,267,323 | 11/1993 | Kimura | 381/110 |
| 5,323,257 | 6/1994 | Abe et al. | 359/159 |
| 5,359,448 | 10/1994 | Laszlo et al. | 359/180 |
| 5,495,357 | 2/1996 | Osterhout | 359/152 |
| 5,548,654 | 8/1996 | Fast | 381/77 |
| 5,563,951 | 10/1996 | Wang et al. | 381/24 |
| 5,596,648 | 1/1997 | Fast | 381/77 |

*Primary Examiner*—Nina Tong
*Attorney, Agent, or Firm*—Lloyd W. Sadler

[57] ABSTRACT

A method and system for providing improved confined area audio amplification is provided. Designed to meet the requirements of classrooms, conference rooms and offices, this new invention provides improved signal-to-noise ratio, improved system redundancy, and higher voice audio quality than is offered in previous systems. This invention utilizes infrared as the wireless communications channel, and does so with two receivers, a master and a slave to provide redundancy in signal reception and thereby solving one of the long standing problems with line of sight communications systems. This invention also employs a pulse position modulated signal which has higher noise and interference immunitity that is available with prior systems. This invention is flexible with a lightweight, wireless, battery operated transmitter packaged in a necklace type of holder, suitable for wearing around the neck of the speaker. This invention employs speech processing techniques to improve the sound quality and clarity of human speech audio. This invention is further innovative in its combination of features that are focused on solving the problem of amplification of speech in a confined area.

4 Claims, 19 Drawing Sheets

METHOD AND SYSTEM FOR PROVIDING IMPROVED WIRELESS AUDIO TRANSMISSION

Be it known that Claudia Amelia Parry Anderson, Jeffrey David Anderson and Steven E. Bash, citizens of the United States of America, have invented a new and useful invention entitled METHOD AND SYSTEM FOR PROVIDING IMPROVED WIRELESS AUDIO TRANSMISSION of which the following comprises a complete specification. This application is based on a Provisional Application Serial No. 60/004,794 which was filed on Oct. 3, 1995, and priority is claimed thereto.

BACKGROUND OF THE INVENTION

1. Field of the Invention

This invention relates to the amplification and transmission of audio signals within confined areas, including classrooms, offices and conference rooms. More specifically, this invention relates to audio systems that utilize a portable infrared transmitter, employing pulse position modulation techniques, to transmit voice audio to an infrared receiver which thereby amplifies the received signal and relays the amplified signal to audio speakers positioned throughout the room.

2. Description of Related Art

A variety of infrared communications devices have been developed and are widely used to facilitate confined area communication. Traditionally, these devices provide only part of the communications solution, do not incorporate a wearable transmitter, or do not employ the signal to noise improvement available with pulse position modulation techniques. Prior wireless communications systems utilized frequency modulation (F.M.) techniques. Because of the number of F.M. frequencies in use now, classroom and other confined area users are encountering signal interference which limits the usefulness of existing technology. For general background material, the reader is directed to U.S. Pat. Nos. 5,359,448, 5,323,257, 5,216,238, 5,095,382, 4,882,773, 4,224,482, 4,221,932, 3,927,316, each of which is hereby incorporated by reference in its entirety for the material disclosed therein.

SUMMARY OF THE INVENTION

It is desirable to provide a method of confined area audio amplification which provides improved signal to noise ratio, a wearable wireless transmitter and which is not susceptible to F.M. interference. Namely, an audio transmission system is desired that will meet the amplification needs of classrooms, conference rooms and offices.

It is the general objective of this invention to provide an audio amplification system with a wearable wireless transmitter, an improved signal to noise ratio and that is not susceptible to F.M. interference.

It is a further objective of this invention to provide a transmitter that is battery powered.

It is a further objective of this invention to provide an infrared wireless communications channel between the transmitter and the receiver.

It is a further objective of this invention to provide an audio transmitter designed into a necklace type of apparatus, suitable for wearing around the neck.

It is a further objective of this invention to provide a transmitter system which incorporates a battery power supply, a battery charger, a microphone, an audio amplifier, a speech processor, a pulse generator which produces a pulse train which is then frequency modulated thereby producing a Pulse Position Modulated (PPM) signal, and a plurality of banks of infrared (IR) Light Emitting Diodes (LEDs).

It is a further objective of this invention to provide a receiver system which receives the transmitted IR PPM signal and converts the signal from IR to electrical and decompresses the signal prior to further transmission to one or more audio speakers.

It is a further objective of this invention to provide a receiver system which includes filtering, pre-emphasis, de-emphasis and amplification functions to enhance the quality of the resultant audio.

It is a further objective of this invention to provide a receiver system incorporating both a master and a slave audio receiver to maintain a maximum signal strength audio signal.

It is a further objective of this invention to provide a receiver system with an integrated power supply.

It is a further objective of this invention to provide auxiliary inputs to the receiver system to permit a mix of audio from additional sources such as audio tape, phonograph, compact disk or video tape.

It is a further objective of this invention to provide a speech processor common to both the transmitter and the receiver systems to process the audio signal, to adjust signal level and response.

It is yet a further objective of this invention to provide a flexible, rugged, and adaptable audio transmission system suitable for use in any confined area and with minimal inconvenience to the wearer and maximum signal quality to the listeners.

These and other objectives of this invention are achieved by a method comprising the steps of receiving audio information to a microphone, processing such audio information, compressing the resultant audio, converting the audio for transmission across an IR channel, receiving the IR signal, decompressing and processing the received audio, transmitting such audio information to a number of audio speakers, and converting the electrical audio signals to sound through use of the audio speakers.

In a preferred embodiment, the method of this invention is accomplished in an electronic device. This electronic device is divided into component parts, namely the transmitter unit, the master receiver and the slave receiver. Also provided within both the transmitter and the receivers are power supplies and a speech processor. This preferred embodiment employs IR diodes for the transmission and reception of an IR signal.

This approach provides an audio transmission system suitable to use in a classroom, conference room or office environment with high signal to noise ratio, low susceptibility to F.M. interference and in a flexible wearable package.

DETAILED DESCRIPTION OF THE INVENTION

This invention is a Frequency Modulated (F.M.) subcarrier modulated infrared (IR) speech transmission system, which in its preferred embodiment utilizes a low power transmitter system with a high gain receiver system. The preferred transmitter system is portable, battery operated, and consists of a battery pack unit, a necklace containing three Light Emitting Diode (LED) banks, a speech processor, a microphone, and a battery charger. The preferred receiver system includes a master receiver, a slave receiver four speakers and a plug in power transformer.

Figure 1:
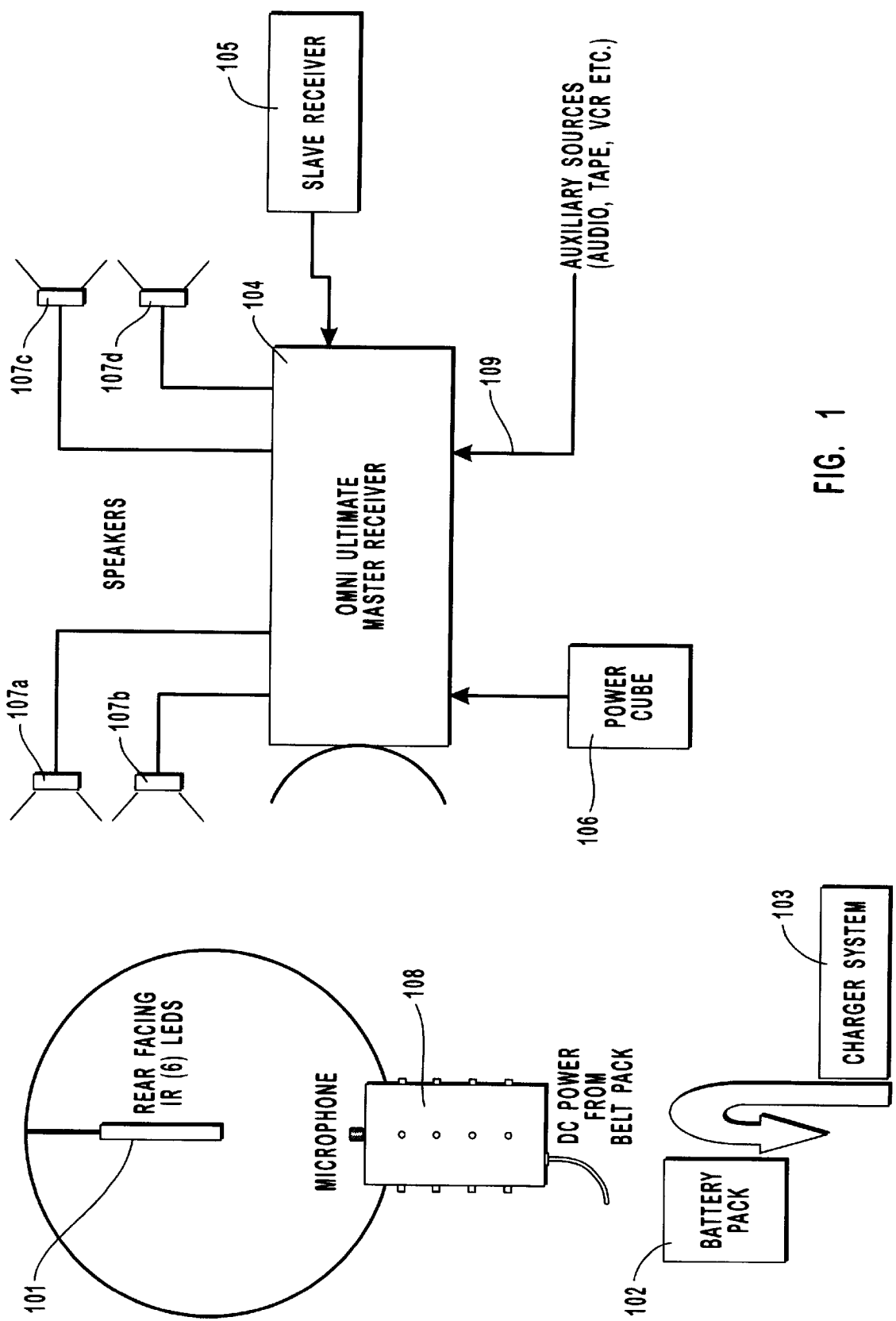
FIG. 1 is a system block diagram showing the major components of one preferred embodiment of the invention.

FIG. 1 depicts a block diagram of the preferred embodiment of the invention. The LED necklace 101 is shown with the integrated microphone 108. The transmitter necklace 101 is electrically connected to the transmitter unit and battery pack 102. A battery charger unit 103 is indicated as being electrically attachable to the transmitter unit and battery pack 102. The master receiver 104 is shown electrically connected to audio speakers 107a–d. Each of the four audio speakers 107a–d are placed appropriately about the room to provide the subjectively best acoustical coverage to the audience. In use the master receiver 104 is placed n a room in a location where it can "see" (have a direct line of sight) to the person wearing (the "wearer") the LED necklace 101. An auxiliary source input 109 to the master receiver 104 is provided to mix in audio from additional sources, such as: audio tape, compact disk, phonograph or video cassette recorder (VCR). A power supply unit 106 is shown as being electrically connectable to the master receiver 104. A slave receiver 105 is shown electrically connectable to the master receiver 104. This slave receiver 105 is placed in the same room as the master receiver 104 so as to pick up the wearer when he or she is out of range of the master receiver 104 or when the wearer is positioned in such a way that the signal becomes degraded. The receiving system contains circuit elements for the purpose of turning off (or "muting") the audio when the received by either the master receiver 104 or the slave receiver 105 is not strong enough to provide a quality audio signal.

Although in other embodiments of this invention different numbers of speakers 107a–d, receivers 104, 105 and different types of power supplies and chargers 103, 106 may be employed, if there are functionally equivalent to that purpose described here, they would be considered to be comprehended within the scope of the invention.

Figure 2:
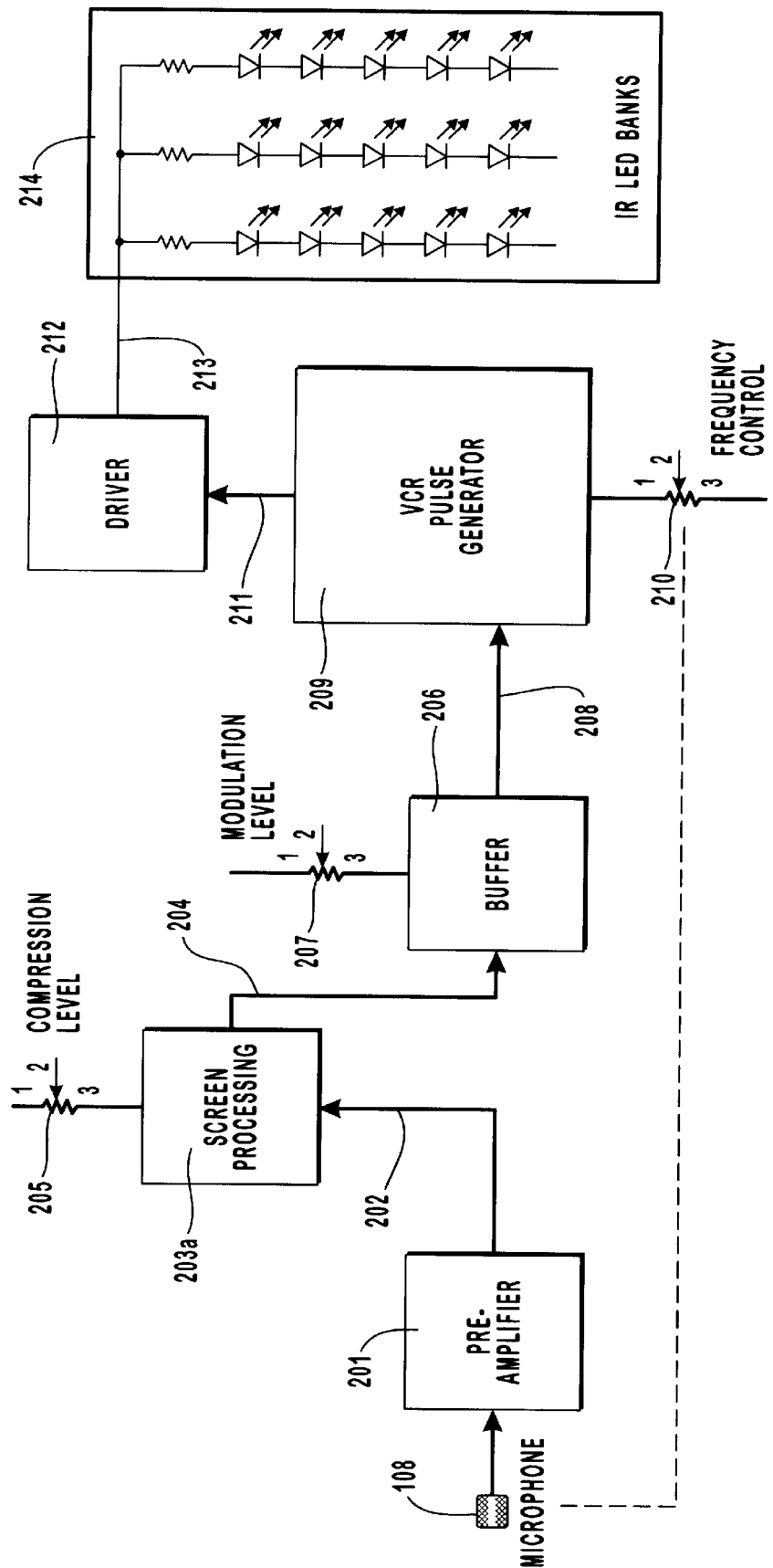
FIG. 2 is a block diagram of the IR transmitter component of one preferred embodiment of the invention.

FIG. 2 depicts the IR transmitter system component 101, 102, 103, 108 in further detail. In the preferred embodiment a condenser type microphone 108 electrically connected to a pre-amplifier 201. The output of the pre-amplifier 201 is an amplified audio signal 202. This amplified audio is fed from the pre-amplifier 201 to the speech processor 203. The speech processor 203 is described below. The speech processor 203 receives the amplified audio signal 202 and generates a processed/compressed audio signal 204. The level of compression accomplished by the speech processor 203a is determined by the setting of the compression level potentiometer 205, which is electrically connected to the speech processor 203. The processed/compressed audio signal 204 is electrically input to the buffer 206. The level of signal modulation is controlled by adjustment of the modulation level potentiometer 207, which is electrically connected to the buffer 206. The buffer 206 amplifies the processed/compressed audio signal 204 creating a buffered audio signal 208 which is fed to a pulse generator 209. The pulse generator 209 produces a pulse train frequency modulated by the application of the buffered audio signal 208 to the control voltage input 601 of the timer integrated circuit 602. Frequency trim control is accomplished by adjusting the frequency control potentiometer 210, which is electrically connected to the pulse generator 209. The pulse generator 209 produces, at its output, a pulse position modulated signal 211. The pulse position modulated signal 211 is applied to a driver circuit 212. The driver circuit 212 produces a LED input signal 213 which in turn is input to the banks of IR LEDs 214 to produce the desired IR signal at the output of the IR transmitter 101, 102.

FIG. 2 also shows the power supply 215 to the IR transmitter 101, 102. This power supply 215 is itself composed of a voltage regulator 216 which has a input plug for a battery charger. An indicator LED 217 is lighted when the battery charger is plugged in. The voltage regulator output 221 is electrically connected to both a battery 220 and an on/off switch 218. A power-on indicator LED 219 is lighted when the power switch 218 is turned on.

Figure 3:
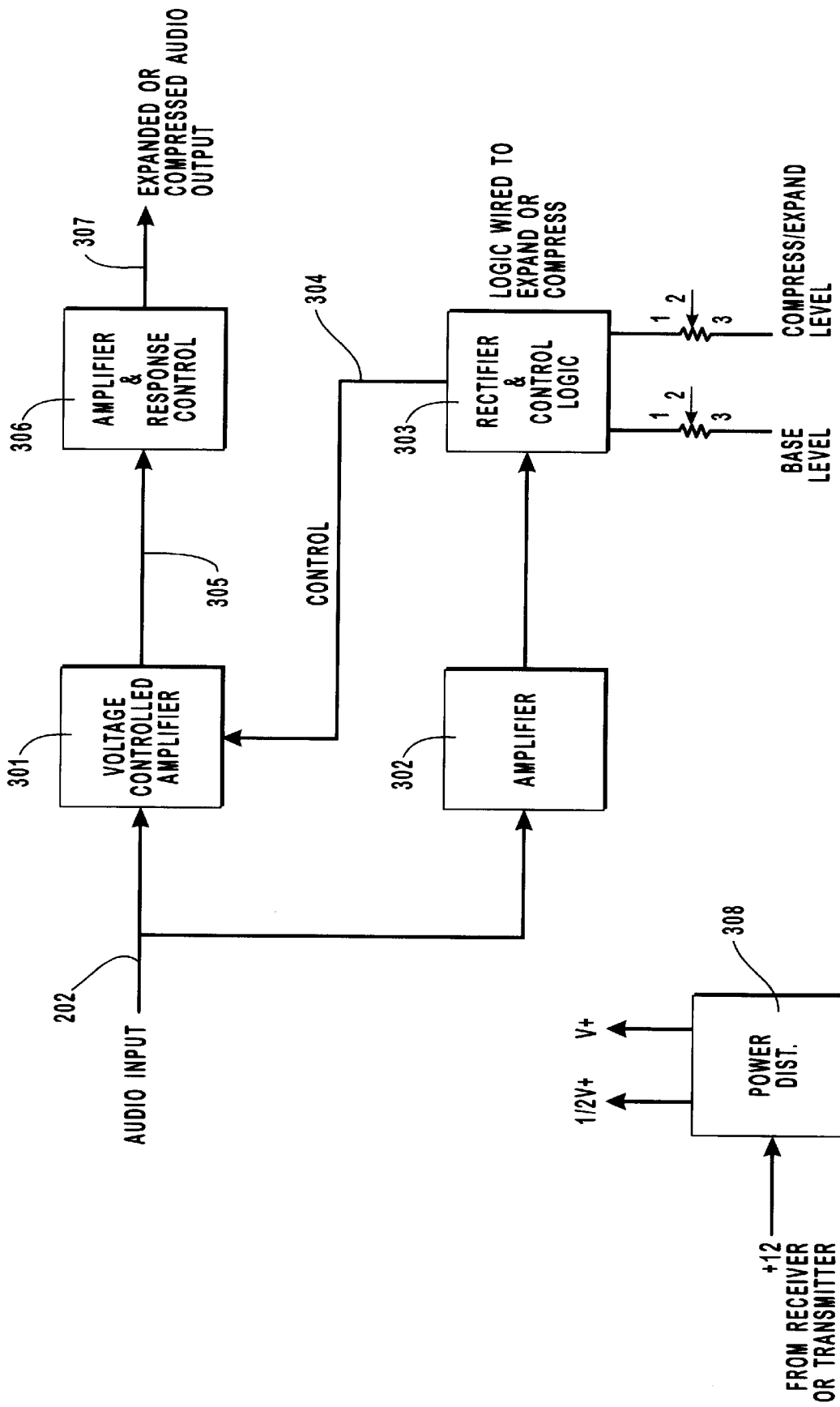
FIG. 3 is a block diagram of the speech processor component of one preferred embodiment of the invention.

FIG. 3 depicts a block diagram of the speech processor component 203 of the invention. The amplified audio signal 202 is presented at the input of a voltage controlled amplifier 301 as well as to an operational amplifier 302. The operational amplifier 302 sets the amount of signal to the rectifier 303. The rectifier 303 generates a control voltage signal 304 which in turn controls the gain of the voltage controlled amplifier 301. The output of the voltage controlled amplifier 305 is routed to a differential amplifier and audio frequency response circuitry 306. The output 307 of the differential amplifier and audio frequency response circuitry 306 is returned to either the transmitter 102 or the master receiver 104. A power distribution component 308 is used to receive power from either the transmitter 102 or the master receiver 104 and to provide power to the speech processor components 301, 302, 303, 306.

Figure 4:
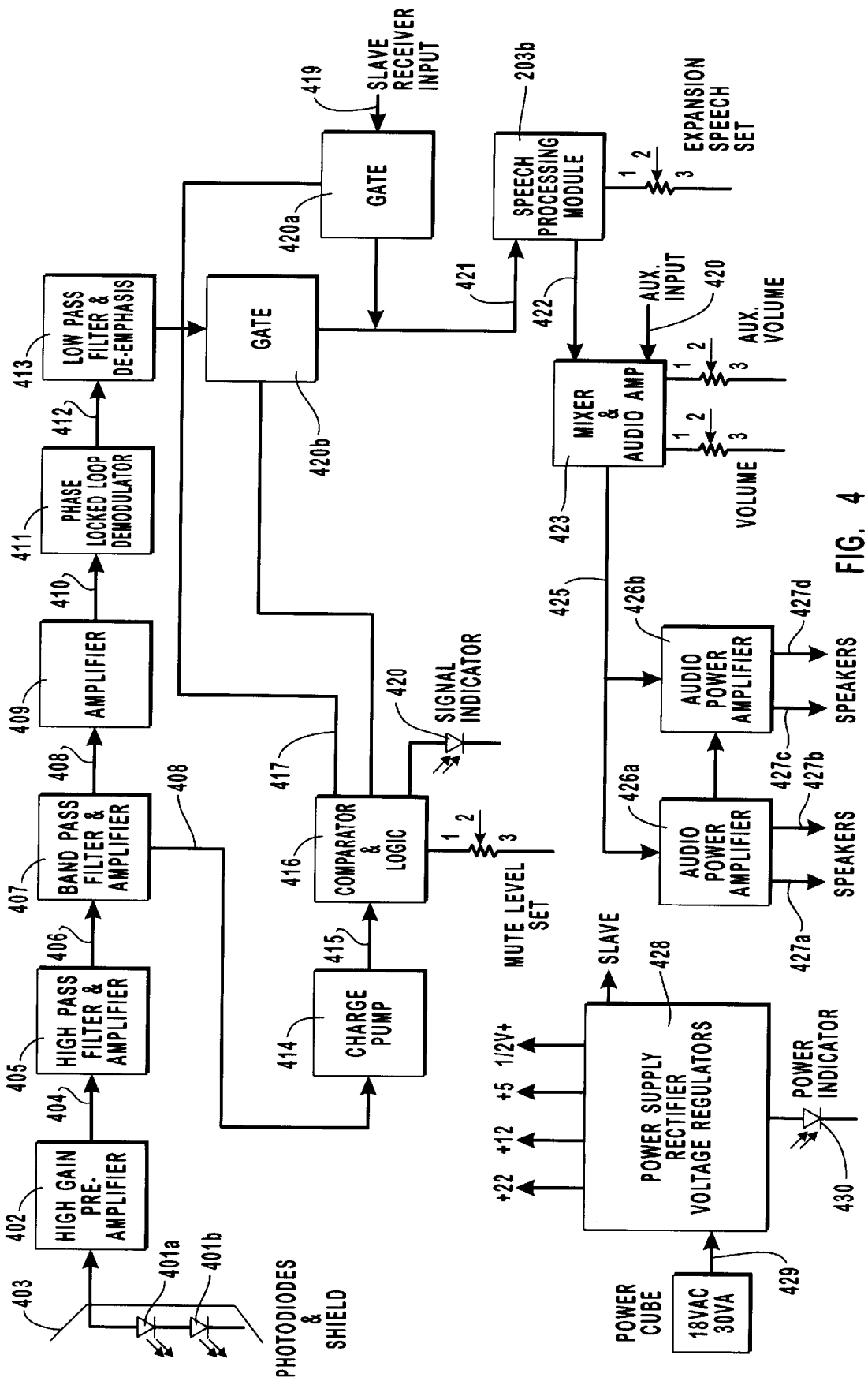
FIG. 4 is a block diagram of the master receiver component of one preferred embodiment of the invention.

FIG. 4 depicts the master receiver component 104 of the invention. In the preferred embodiment of the invention reception of the IR signal is provided through two photo-diodes 401a and 401b which are connected in series and then electrically connected to the input of a high gain preamplifier 402. A metal shield 403 is provided to reduce electrical interference and provide some reflectivity for the photo-diodes 401a and 401b. The metal shield 403 is bent in a somewhat parabolic shape. The output 404 of the high gain preamplifier 402 is fed into a high pass filter and amplifier 405. The output 406 of the high pass filter and amplifier 405 is input to a LC bandpass filter and amplifier 407. This LC bandpass filter and amplifier 407 is tuned for the best envelope at the output 408 of the LC bandpass filter and amplifier 407. The output 408 of the LC bandpass filter and amplifier 407 is further amplified by amplifier 409. The output 410 of amplifier 409 is input to a phase locked loop demodulator 411. The resulting audio signal 412 still has some of the RF subcarrier in the signal. This resulting audio signal 412 is then input to a low pass filter and de-emphasis network 413 to limit audio response to speech frequencies. This low pass filter and de-emphasis networks 413 is employed to reduce audio hiss and noise from the audio signal. The corner frequency of this network 413 is about 5 k Hz.

The output 408 of the LC bandpass filter and amplifier 407 is also fed to a charge pump 414 whose output 415 is input to a comparator 416. The comparator 416 operates pulling its output 417 low when the voltage produced by the charge pump 414 rises above a reference voltage, this in turn lights a signal indicator 418 and switches in the signal input 419 from the slave receiver 105 by the use of gates 420a and 420b. The outputs of gates 420a and 420b are mixed into the input signal 421 into the speech processor 203b. The output 422 of the speech processor 203b is input to a mixer and audio amplifier 423 and is mixed with signal received from the aux input 424. The mixer and audio amplifier 423 output signal 425 is split into two discrete audio power amplifiers 426a and 426b. Each discrete audio power amplifier 426a and 426b operates class AB and can produce about 10 watts RMS each. Each discrete audio power amplifier 426a and 426b has two outputs 427a, 427b, 427c, and 427d and are capable of driving 8 Ohm speakers.

FIG. 4 also depicts the power supply 428 which provides power to the master receiver 104. The power supply 428 has an AC power connection 429 and a power indicator diode 430.

Figure 5:
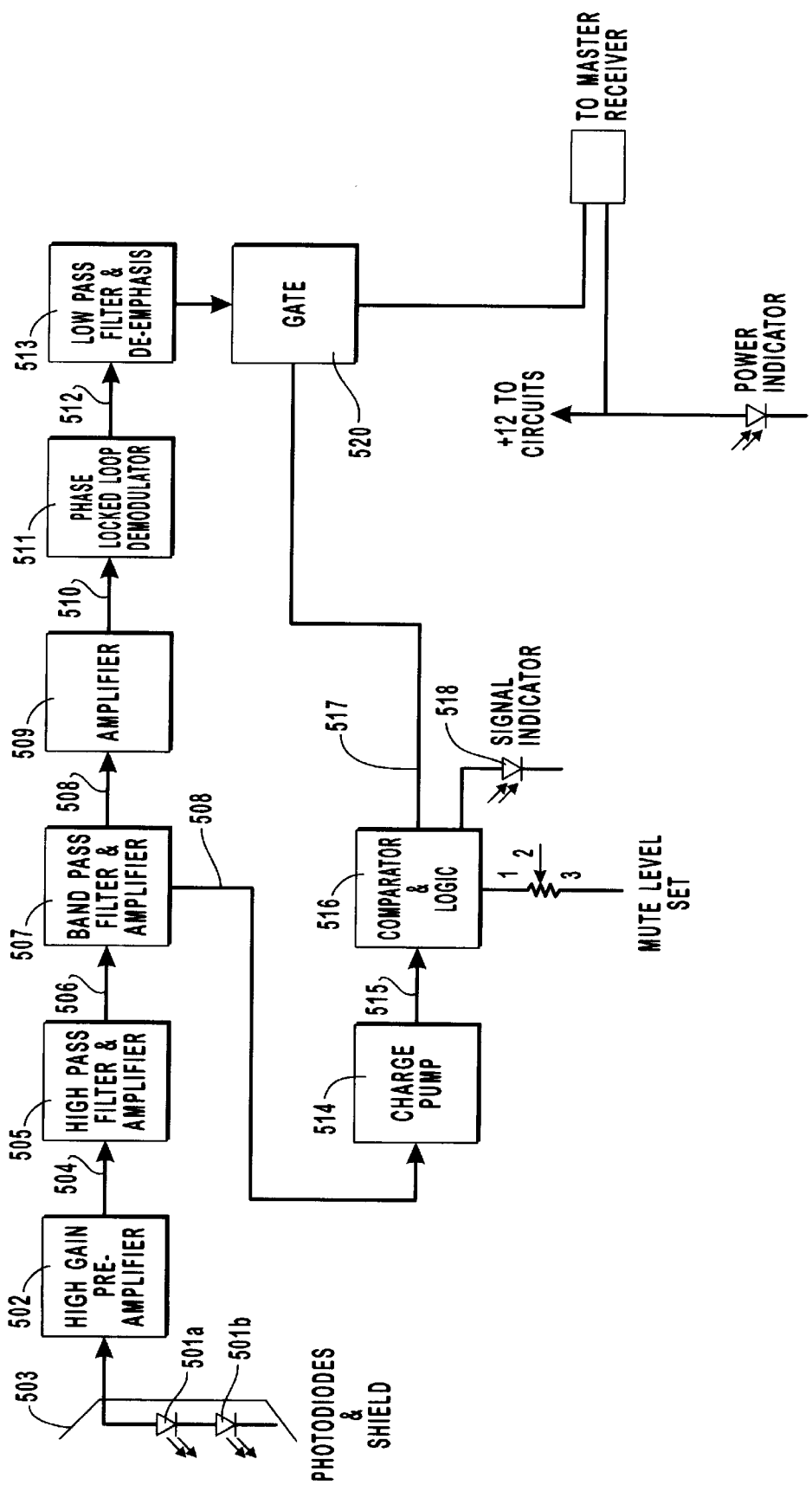
FIG. 5 is a block diagram of the slave receiver component of one preferred embodiment of the invention.

FIG. 5 depicts the block diagram of the slave receiver 105. In the preferred embodiment of the invention reception of the IR signal to the slave receiver 105 is provided through two photodiodes 501a and 501b which are connected in series and then electrically connected to the input of a high gain preamplifier 502. A metal shield 503 is provided to reduce electrical interference and provide some reflectivity for the photodiodes 501a and 501b. The metal shield 503 is bent in a somewhat parabolic shape. The output 504 of the high gain preamplifier 502 is fed into a high pass filter and amplifier 505. The output 506 of the high pass filter and amplifier 505 is input to a LC bandpass filter and amplifier 507. This LC bandpass filter and amplifier 507 is tuned for the best envelope at the output 508 of the LC bandpass filter and amplifier 507. The output 508 of the LC bandpass filter and amplifier 507 is further amplified by amplifier 509. The output 510 of amplifier 509 is input to a phase locked loop demodulator 511. The resulting audio signal 512 still has some of the RF subcarrier in the signal. This resulting audio signal 512 is then input to a low pass filter and de-emphasis network 513 to limit audio response to speech frequencies. This low pass filter and de-emphasis networks 513 is employed to reduce audio hiss and noise from the audio signal. The corner frequency of this network 513 is about 5 k Hz.

The output 508 of the LC bandpass filter and amplifier 507 is also fed to a charge pump 514 whose output 515 is input to a comparator 516. The comparitor 516 operates pulling its output 517 low when the voltage produced by the charge pump 514 rises above a reference voltage, this in turn lights a signal indicator 518 and switches in the signal input 519 from the slave receiver 105 by the use of gates 520a and 520b. The outputs of gate 520 is fed directly to the master receiver 104 for processing and amplification. The slave receiver receives regulated +12 volts from the master receiver 104.

Figure 6A:
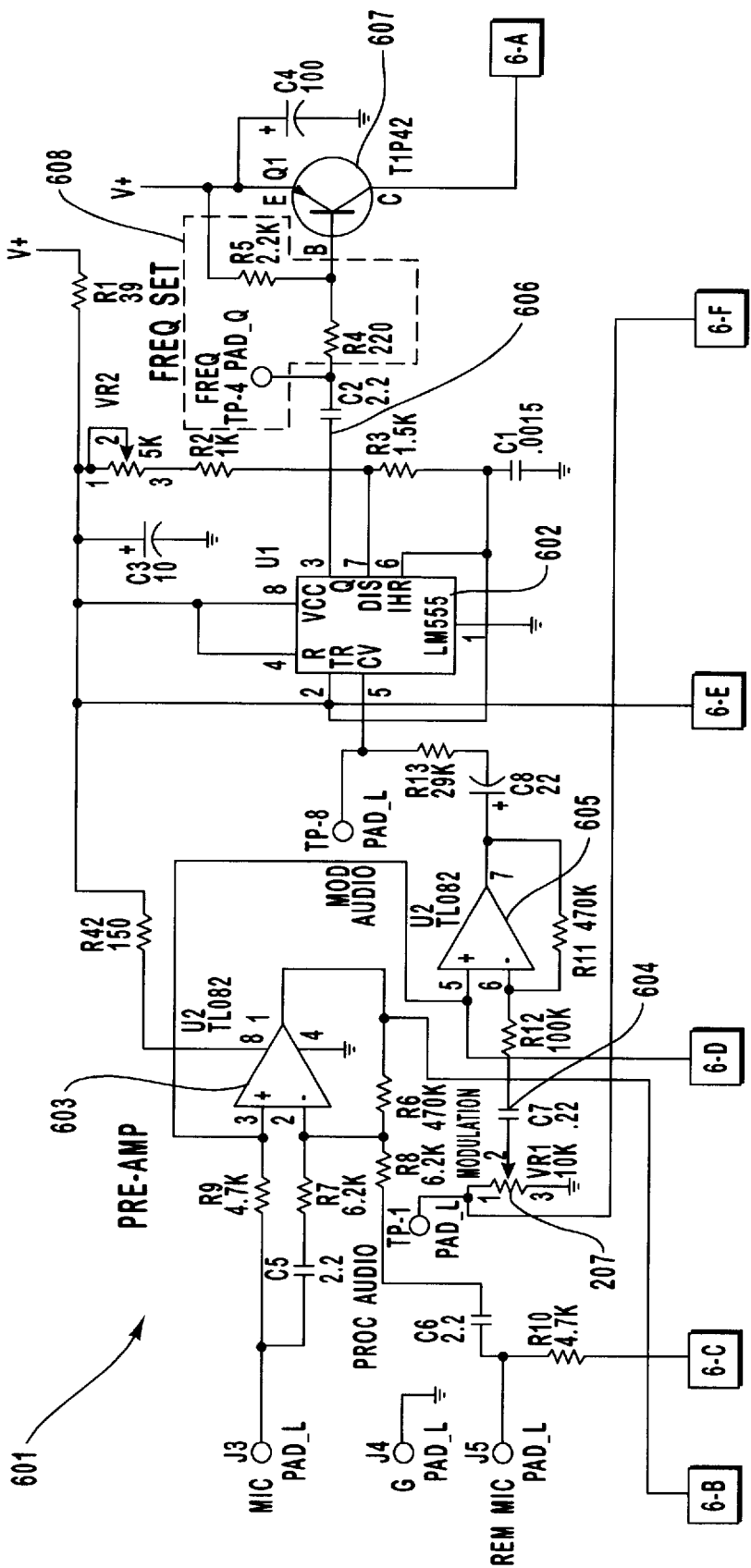
FIG. 6 is an schematic of one preferred embodiment of the IR transmitter component of the invention.
Figure 6B:
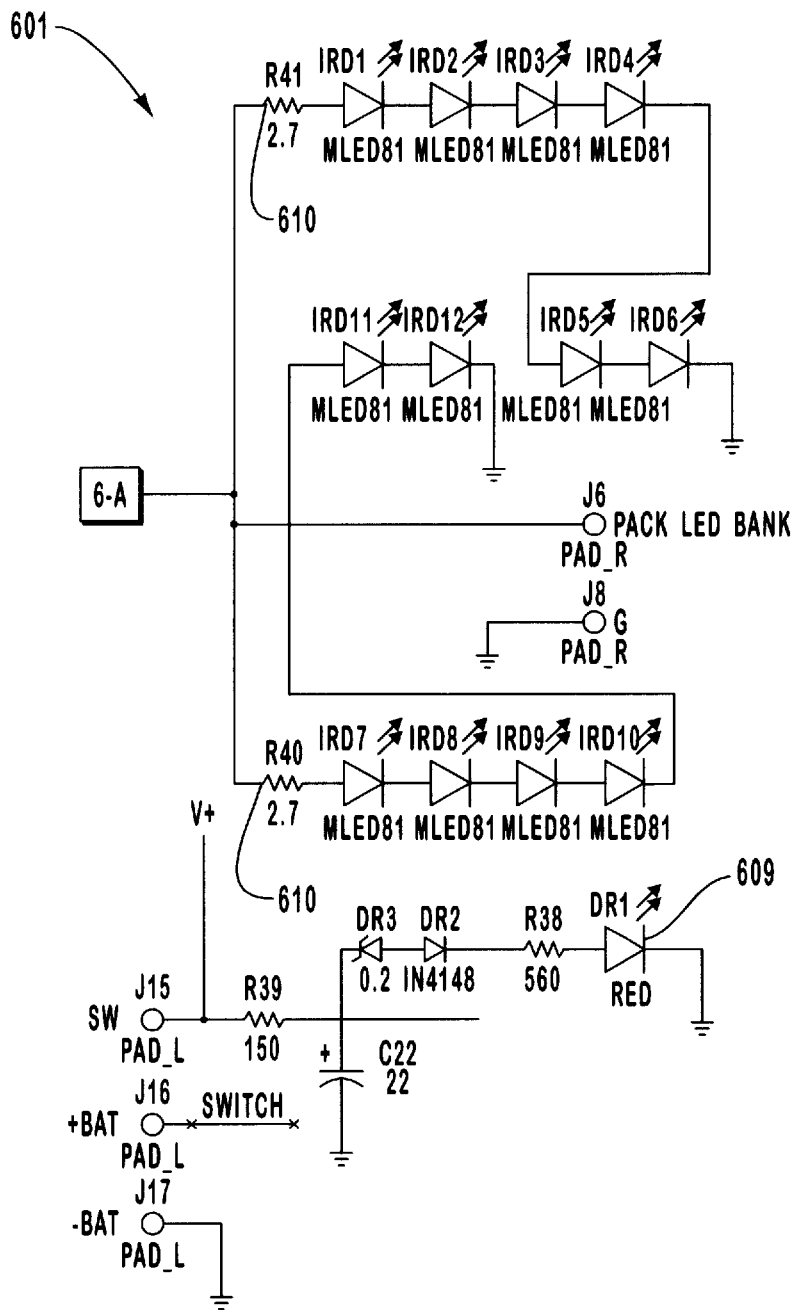
Figure 6C:
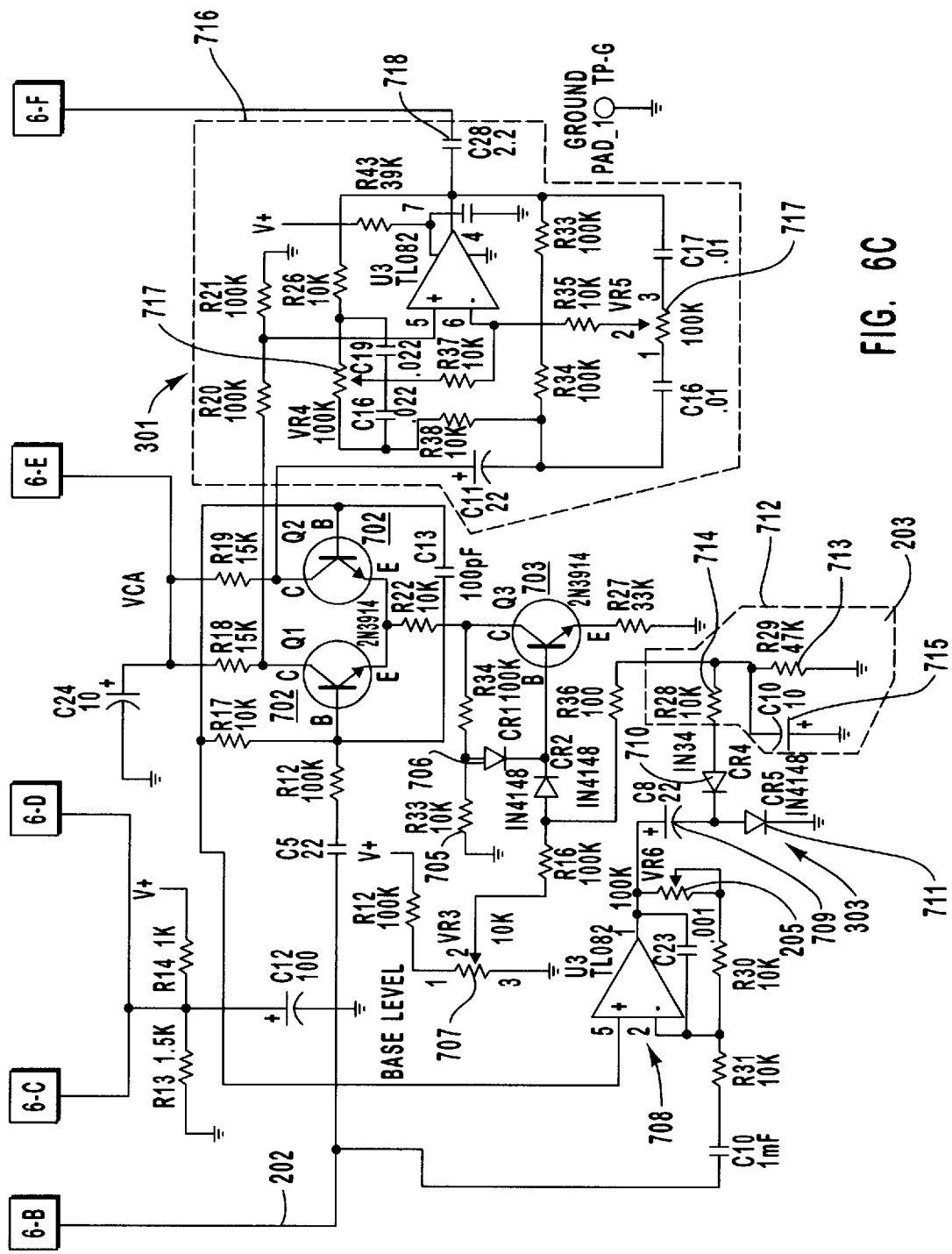

FIG. 6 depicts a detail schematic of one preferred embodiment of the IR transmitter 102 of the invention. The condenser type microphone 108 is connected to the pre-amplifier 201. This pre-amplifier 201 is shown as utilizing an operational amplifier 603 wired for a single supply and having a gain set of about 200. The output of the operational amplifier 603 is fed into the speech processor 203. The processed/compressed audio signal 204 from the speech processor 203 is returned to the IR transmitter to the modulation level potentiometer 207 which is coupled through a coupling capacitor 604 to the buffer 206. The buffer 206 uses an operational amplifier 605. The pulse generator 209 is shown to consist of a 555 timer 602. The 555 timer 602 circuit is wired to produce negative going pulses of approximately 2 microseconds in duration and occurring at the rate of 100 kHz. Frequency trim control is accomplished by adjusting the frequency control potentiometer 210, which is electrically connected to the pulse generator 209. The output 606 of the 555 timer circuit 602 is applied to a PNP type driver transistor 607 through a divider network 608. The values of the divider network 608 are selected so that the driver transistor 607 turns on when the output 606 voltage of the timer drops to about 6 volts. The collector of the driver transistor 607 is connected to the necklace connector 609 through a current limiting resistor 610. The signal at the necklace connector 609 cases the infrared LED banks 214 to turn on for about 2 microseconds then off for about 8 microseconds. This short turn on time reduces the average current drawn from the battery 220.

FIG. 6 also depicts the schematic detail of the battery charger section 215. The battery charger section 215 employs a filter and rectifier circuit 611 electrically connected to a voltage regulator 216 which is set at 13.8 volts to charge the battery 220 without damage. A voltage divider network 612 sets the output voltage of the regulator 216. An indicator LED 217 is lighted when the battery charger is plugged in. A fuse 613 is wired directly in the battery circuit to protect against damage or fire due to a short circuit anywhere in the system.

Figure 7:
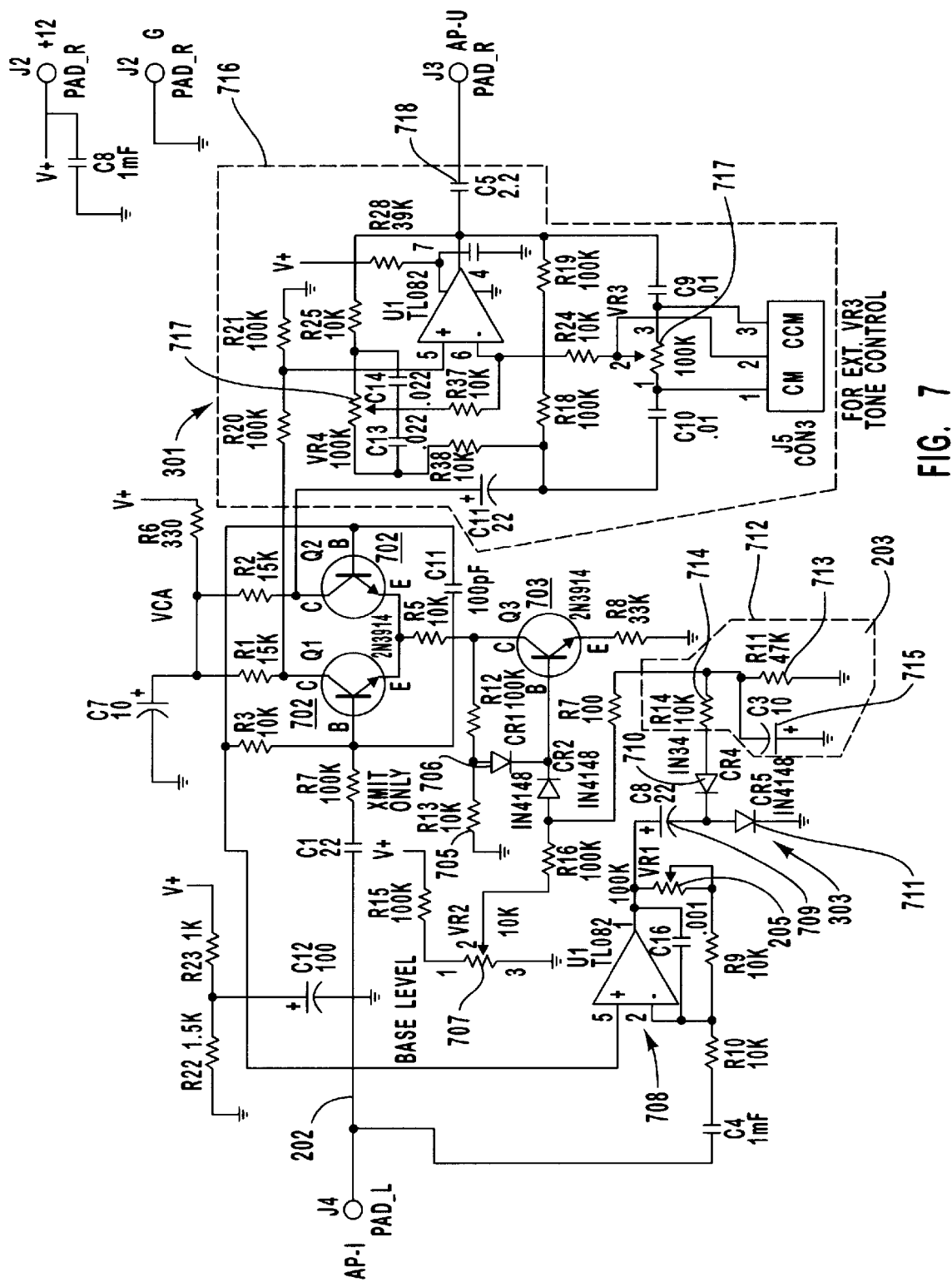
FIG. 7 is an schematic of one preferred embodiment of the speech processor schematic component of the invention.

FIG. 7 is an schematic of one preferred embodiment of the speech processor schematic component of the invention. The amplified audio signal 202 is presented at the input of the voltage controlled amplifier 301. The voltage controlled amplifier 301 is made up of transistors 701, 702, and 703 and associated components. Transistor 703 serves as a current control. Transistor 703 is biased into the linear operating area by two resistors 704 and 705 and a diode 706. A potentiometer 707 and its connected components set up the base gain for the amplifier 301.

An operational amplifier 708 with a potentiometer 205 and attached components sets the amount of signal to the rectifier 303, which is composed of a capacitor 709 and two diodes 710 and 711. A circuit 712 to control the attack and decay time of the control voltage of the rectifier 303 is made up of two resistors 713 and 714 and a capacitor 715. The output of the voltage controlled amplifier 301 is routed to a differential amplifier 716. A circuit within the differential amplifier 716 utilizing a potentiometer 717 allows for fine tuning of audio frequency response. The processed audio signal is returned to either the transmitter 102 or the master receiver 104 through a coupling capacitor 718.

Figures 1, 8A:
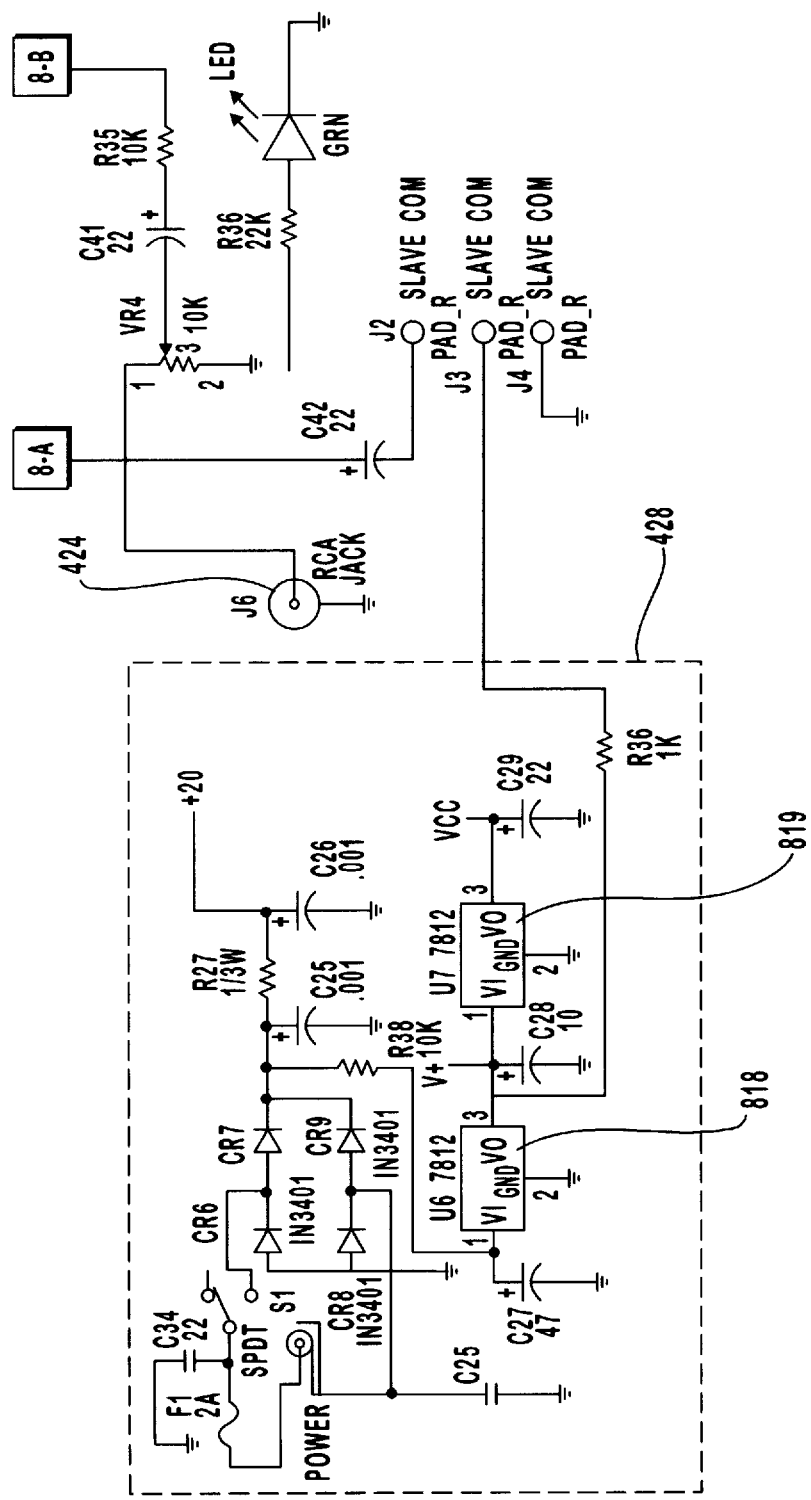
FIGS. 8a and 8b are a schematic of one preferred embodiment of the master receiver component of the invention.
Figures 2, 8A:
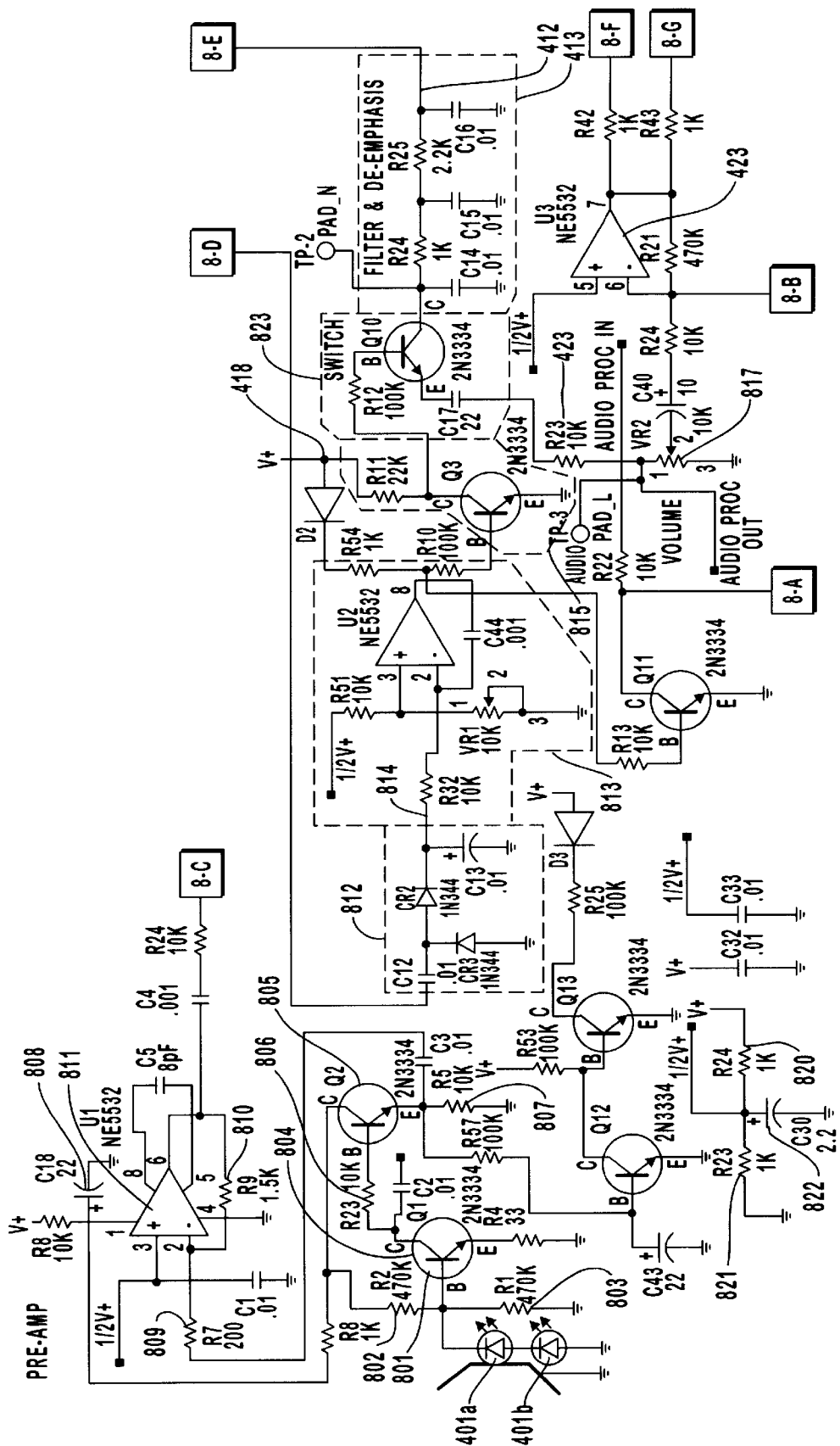
Figures 3, 8A:
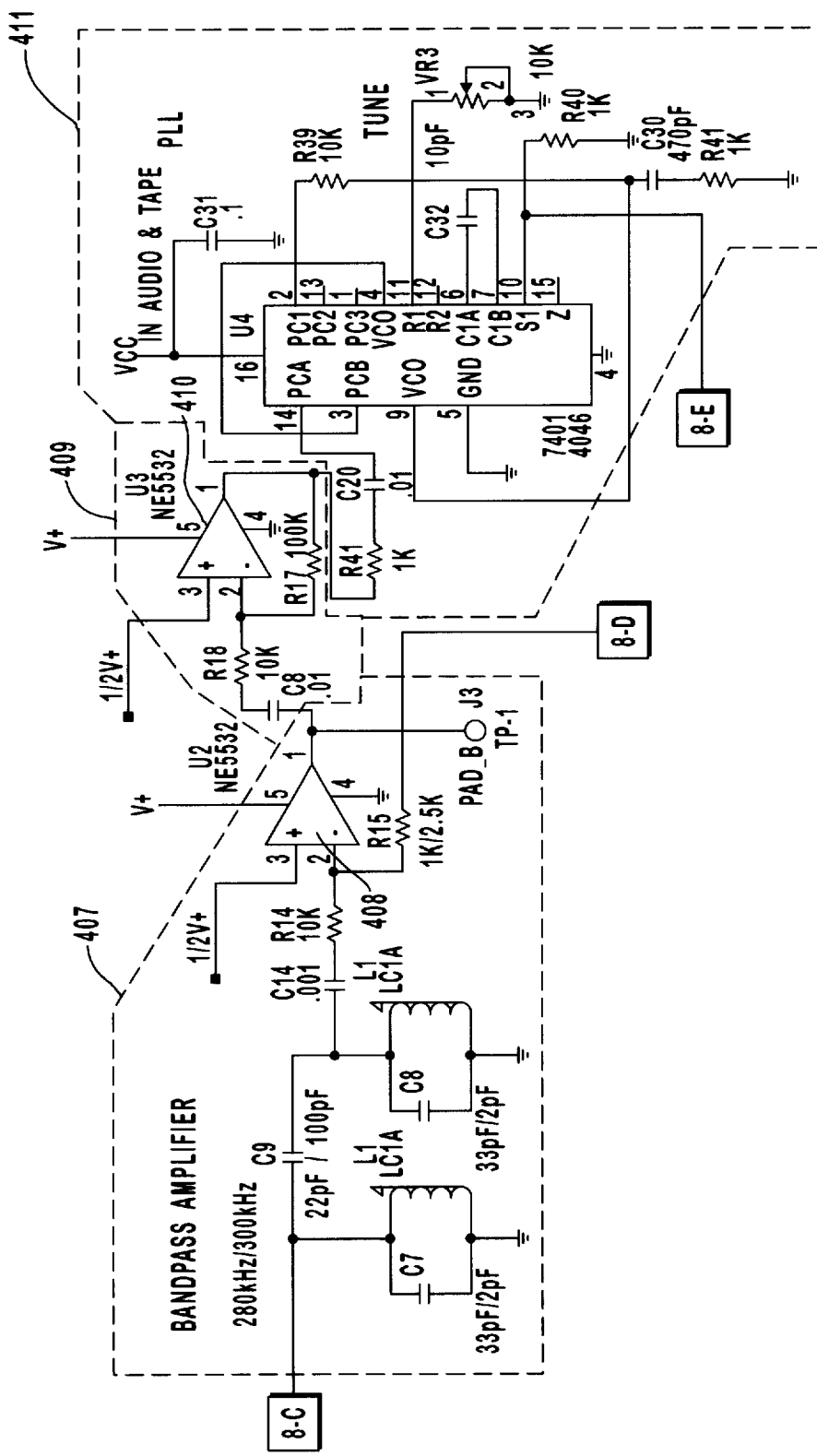
Figures 1, 8B:
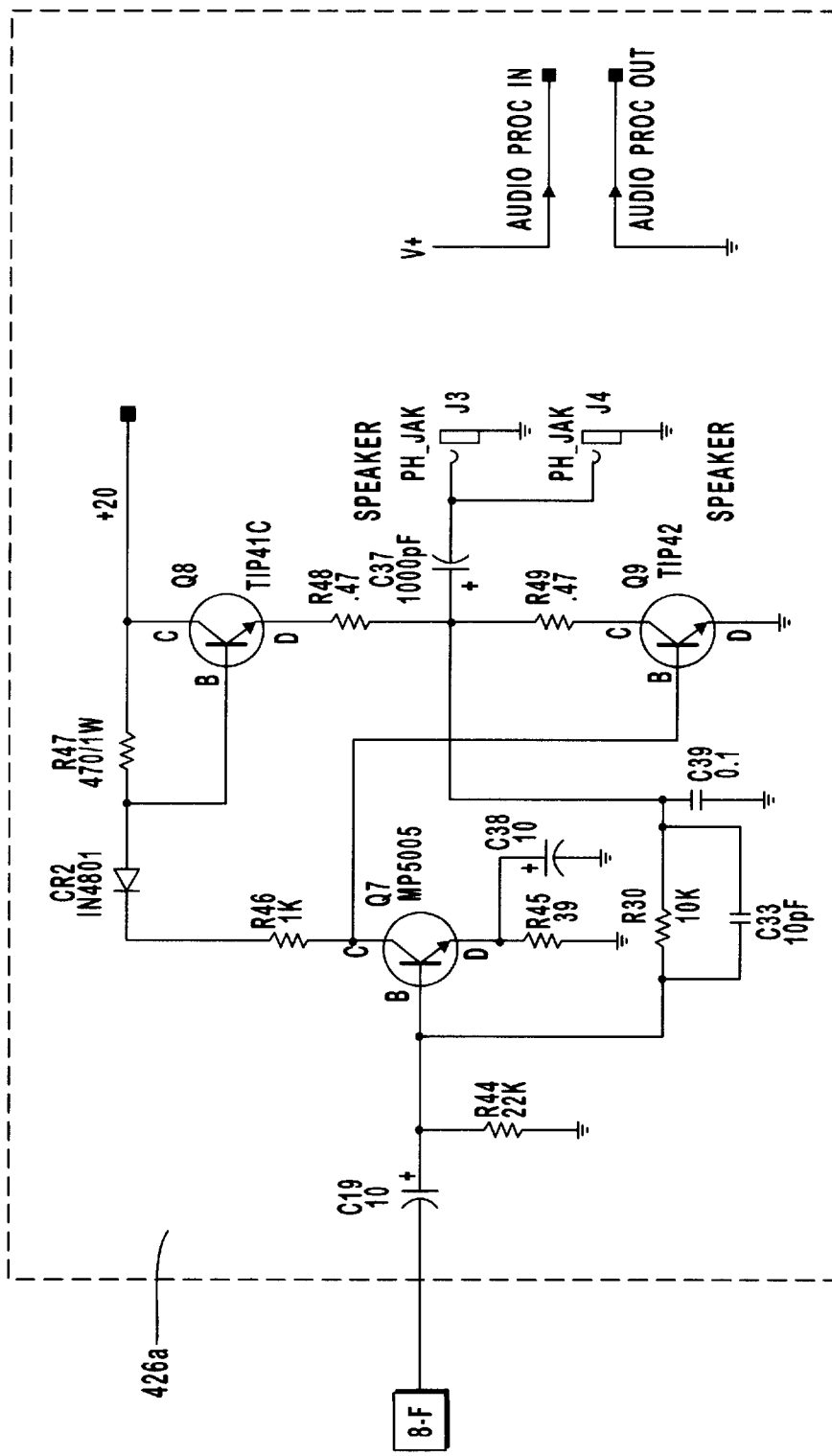
Figures 2, 8B:
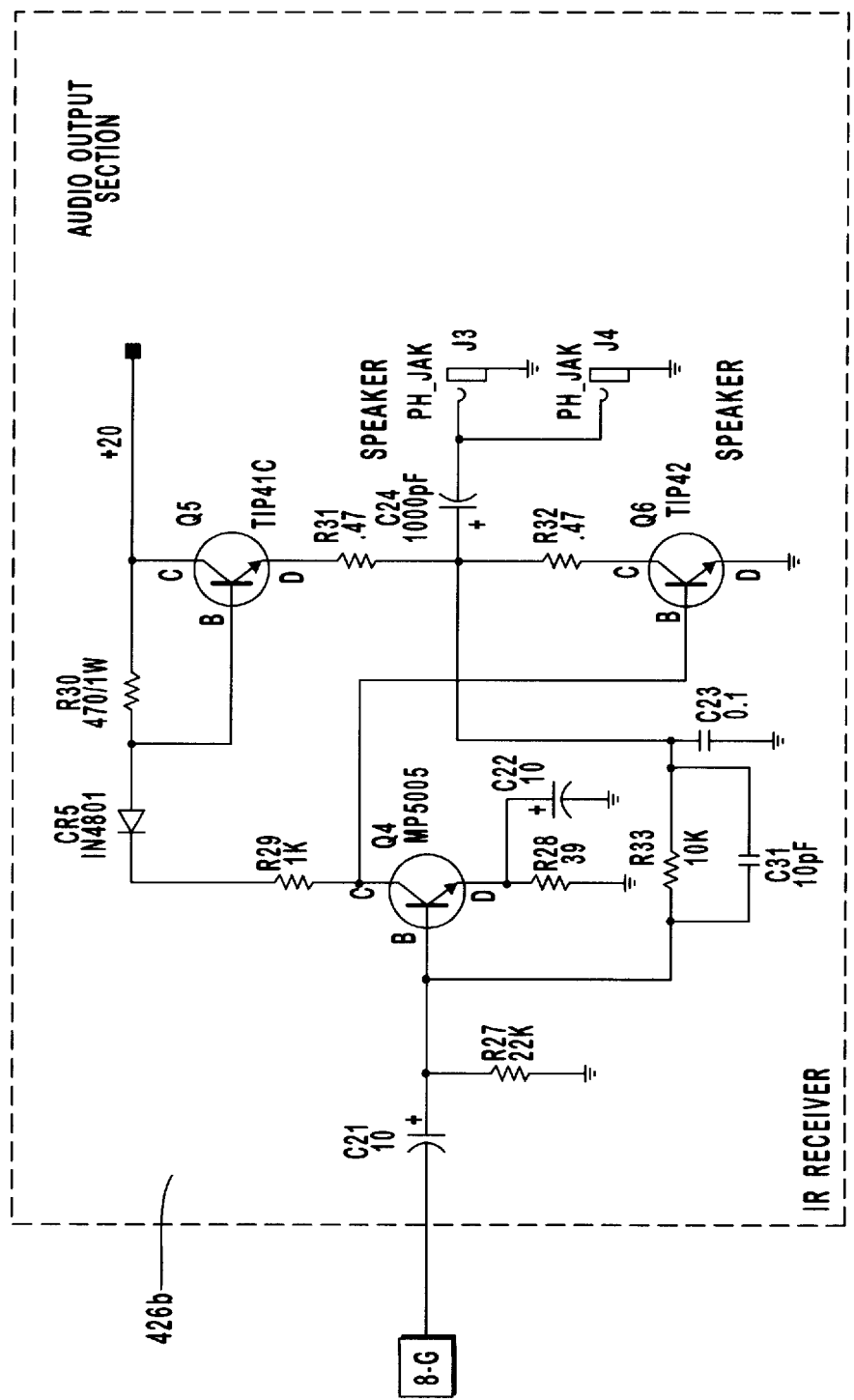

FIGS. 8a and 8b depict schematic drawings of one preferred embodiment of the master receiver component of the invention. The two photodiodes 401a and 401b are connected to the base of a transistor 801 which is the first stage of the high gain pre-amplifier 402. The metal shield 403 is shown. Two resistors 802 and 803 set the critical operating point for the photodiodes 401*a* and 401*b*. Transistors 804 and 805 are coupled in such a was that very small current changes in the photodiodes 401*a* and 401*b* produce a large current change in transistor 805. Some negative feedback occurs through a resistor 806 from the emitter of transistor 805 to help stabilize the amplifier 402. The value of a resistor 807 sets the quiescent operating point. The high pass filter and amplifier 405 is composed of a capacitor 808, two resistors 809 and 810 and an operational amplifier 811. This high pass filter and amplifier 405 is necessary to eliminate 60 Hz interference from electrical lighting. The output 406 of the high pass filter and amplifier 405 then connects to a band pass filter and amplifier 407. The resulting signal 408 is further amplified by an amplifier 409. The output 410 of the amplifier 409 is connected into the input of the phase locked loop demodulator 411. The output 412 of the phase locked loop demodulator 411 is connected to the input of the low pass filter and de-emphasis circuit 413. Audio response as a result of the low pass filter and de-emphasis circuit 413 is limited to speech frequencies. A large amount of pre-emphasis and de-emphasis is employed to reduce the hiss and noise. The corner frequency of this network is about 5 k Hz. The output 408 from the band pass filter and amplifier 407 also is electrically connect to a rectifier circuit 812. The output 814 of the rectifier circuit 812 is electrically connected to the input of a comparitor 813, that is part of the comparitor and logic 416. When the voltage produced by the rectifier network 812 rises above the reference, the output of comparitor 813 goes low. This lights signal LED 418 and turns on the switch 823 that is part of gates 420 via the invertor 815, and also a transistor 816 is turned on shorting the input from the slave receiver 105. If the signal strength produced by the rectifier network 812 falls below the reference level, the audio from the master receiver 104 is shut off and the audio from the slave receiver 105 is allowed to pass, providing that the slave receiver has a good signal.

The signals from the master receiver 104 and the slave receiver 105, if present, are mixed in the mixer 423. The signal then goes to the speech processor 203*b*.

The expanded audio signal output 422 from the speech processor 203*b* connects to the volume control potentiometer 817. The signal is mixed from the aux input 424 by mixer and audio amplifier circuit 423. The resulting audio amplifiers 426*a* and 426*b* are shown in FIG. 8*b*.

The power supply 428 is shown in FIG. 8*a*, it consists of a full wave bridge rectifier, capacitor input filter. An 18 VAC input produces 22 to 24 VDC under load. Regulators 818 and 819 provide +12 and +5 volts needed in the circuit. Resistors 820 and 821 and capacitor 822 make up the ½ V+ needed by all the operational amplifiers for their operation in a single supply environment.

Figure 9A:
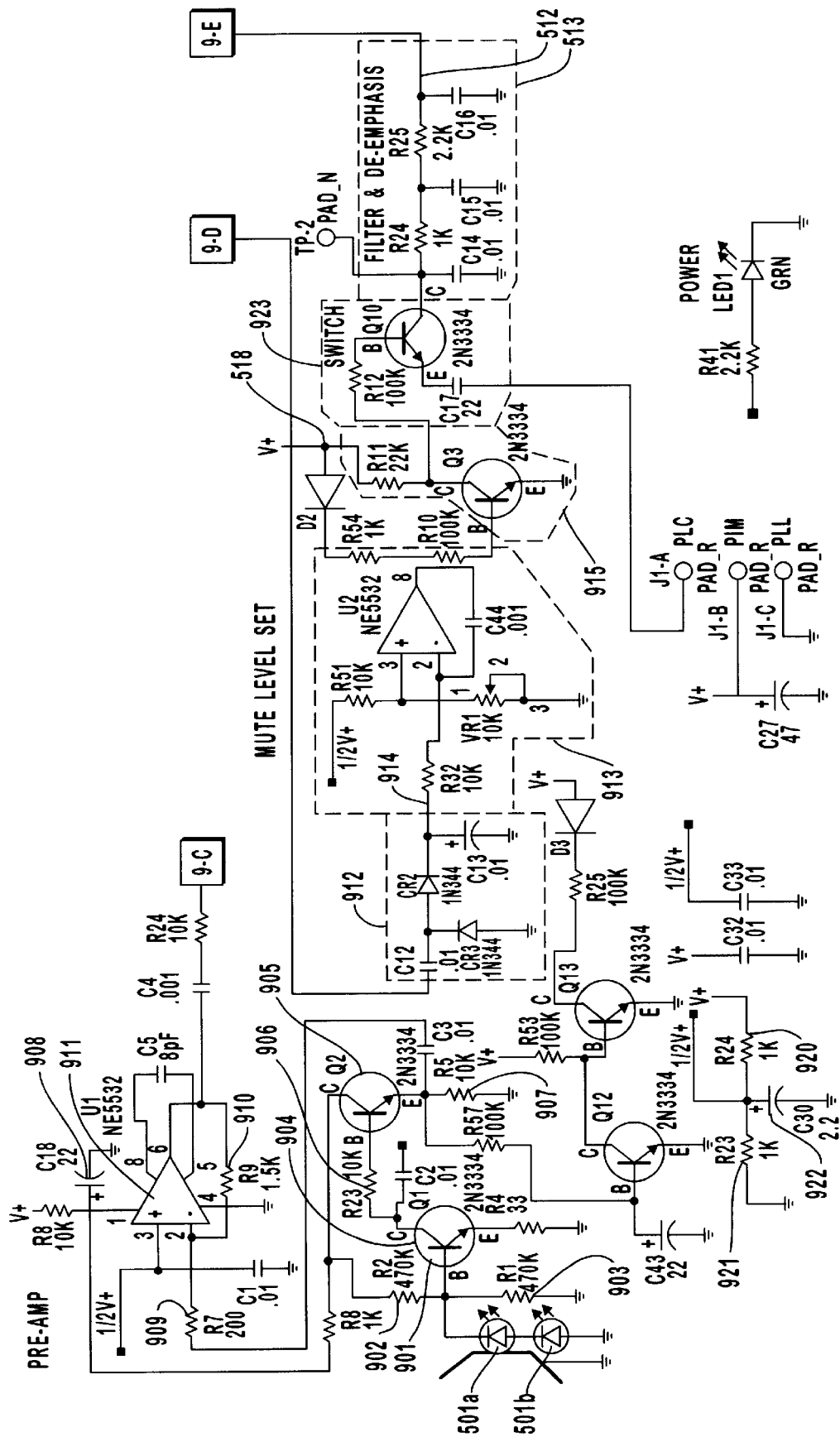
FIG. 9 is an schematic of one preferred embodiment of the slave receiver component of the invention.
Figure 9B:
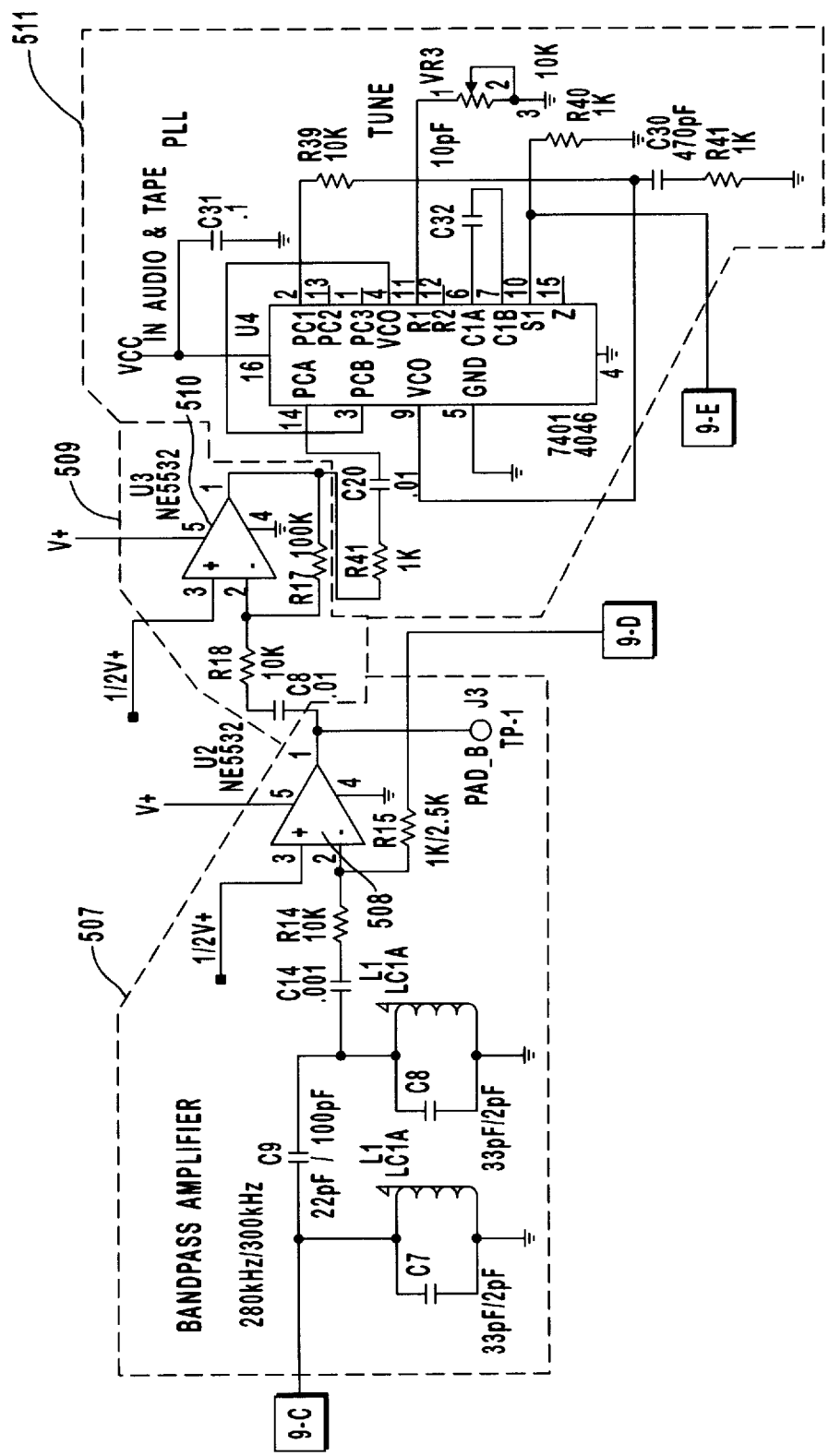

FIG. 9 depict a schematic drawing of one preferred embodiment of the slave receiver 105 component of the invention. The two photodiodes 501*a* and 501*b* are connected to the base of a transistor 901 which is the first stage of the high gain preamplifier 502. The metal shield 503 is shown. Two resistors 902 and 903 set the critical operating point for the photodiodes 501*a* and 501*b*. Transistors 904 and 905 are coupled in such a was that very small current changes in the photodiodes 501*a* and 501*b* produce a large current change in transistor 905. Some negative feedback occurs through a resistor 906 from the emitter of transistor 905 to help stabilize the amplifier 502. The value of a resistor 907 sets the quiescent operating point. The high pass filter and amplifier 505 is composed of a capacitor 908, two resistors 909 and 910 and an operational amplifier 911. This high pass filter and amplifier 505 is necessary to eliminate 60 Hz interference from electrical lighting. The output 506 of the high pass filter and amplifier 505 then connects to a band pass filter and amplifier 507. The resulting signal 508 is further amplified by an amplifier 509. The output 510 of the amplifier 509 is connected into the input of the phase locked loop demodulator 511. The output 512 of the phase locked loop demodulator 511 is connected to the input of the low pass filter and de-emphasis circuit 513. Audio response as a result of the low pass filter and de-emphasis circuit 513 is limited to speech frequencies. A large amount of pre-emphasis and de-emphasis is employed to reduce the hiss and noise. The corner frequency of this network is about 5 k Hz. The output 508 from the band pass filter and amplifier 507 also is electrically connect to a rectifier circuit 912. The output 914 of the rectifier circuit 912 is electrically connected to the input of a comparator 913, that is part of the comparator and logic 516. When the voltage produced by the rectifier network 912 rises above the reference, the output of comparator 913 goes low. This lights signal LED 518 and turns on the switch 923 that is part of gates 520 via the invertor 915.

Figure 10:
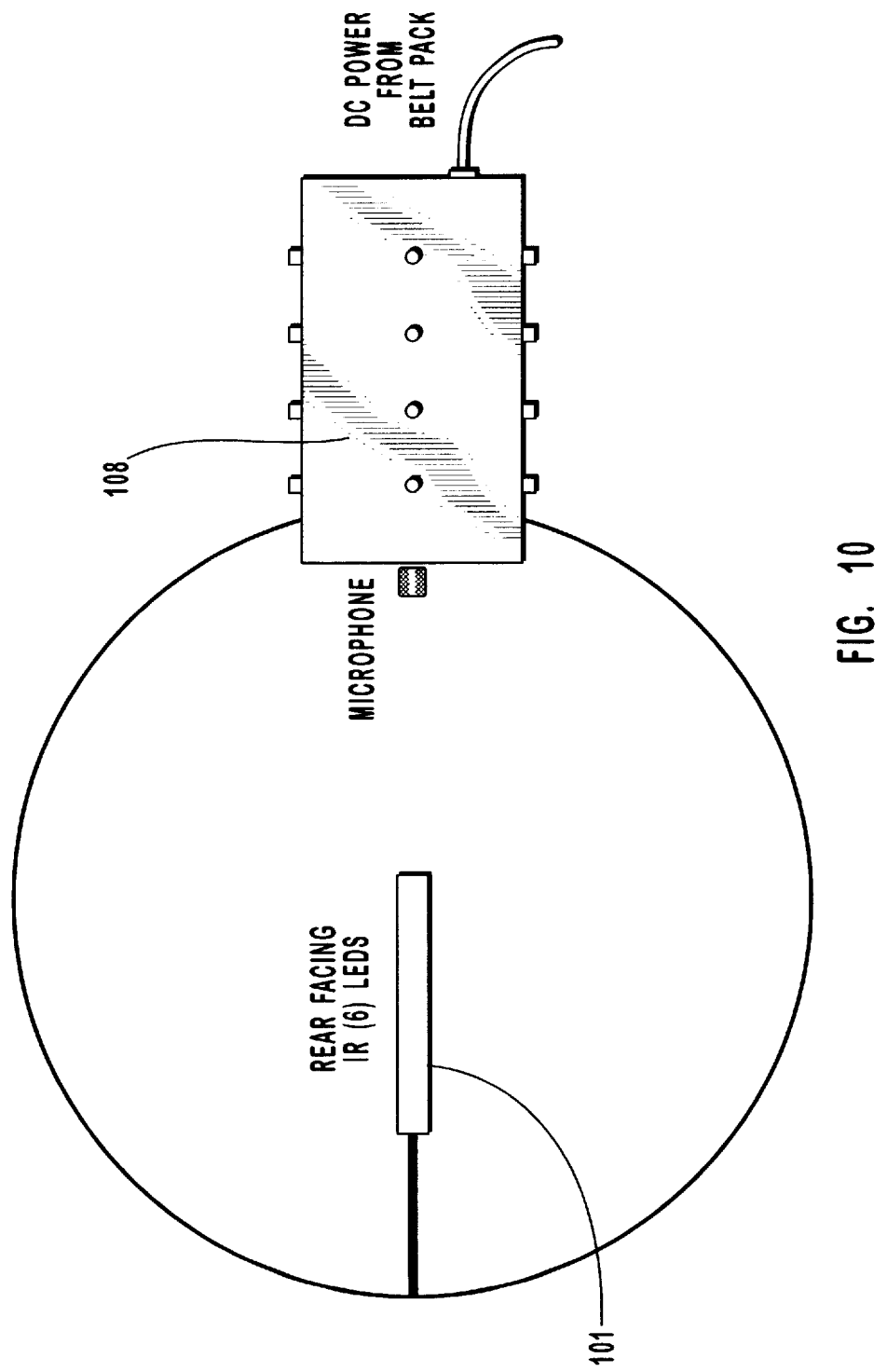
FIG. 10 is an assembly drawing of one preferred embodiment of the transmitter necklace.

FIG. 10 is an assembly drawing of one preferred embodiment of the transmitter necklace 1001. The IR LED banks 214 are shown on each side of the necklace 1001, and the microphone 108 is shown attached to the necklace 1001.

Figure 11:
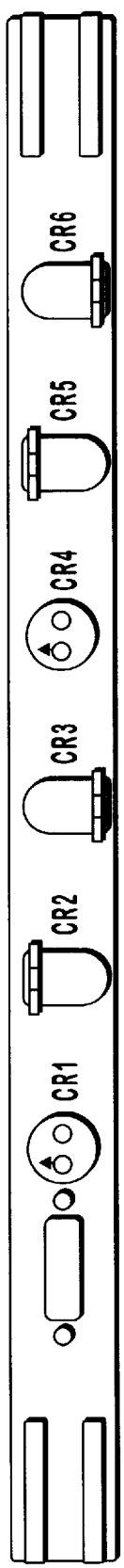
FIG. 11 is a detail drawing of one preferred embodiment of the LED array.

FIG. 11 is a detail drawing of one preferred embodiment of the LED array.

Figure 12:
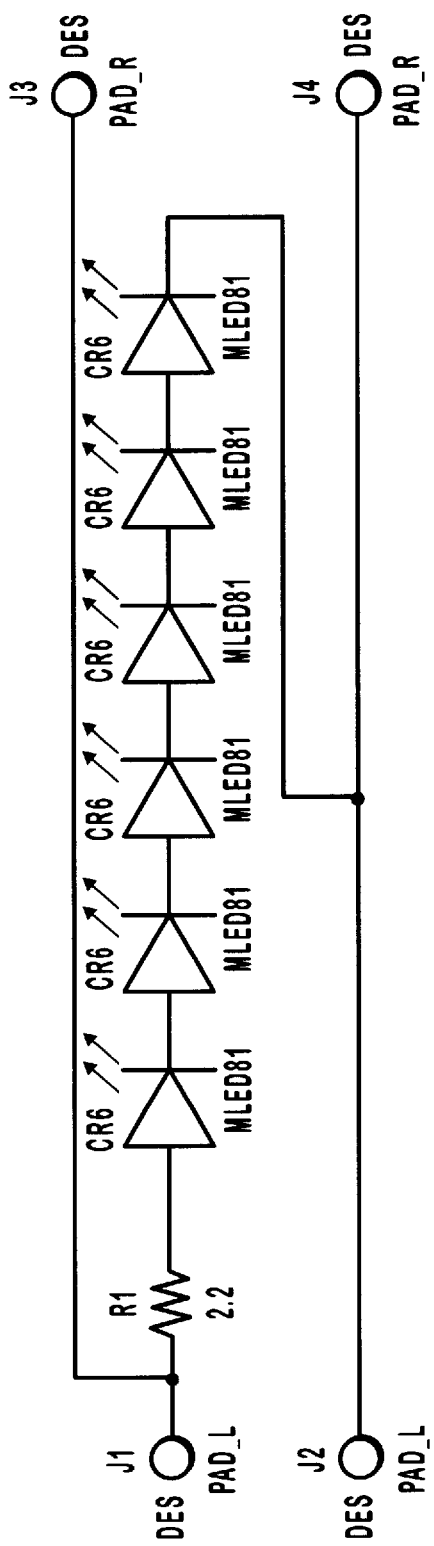
FIG. 12 is a schematic drawing of one preferred embodiment of the LED array.

FIG. 12 is a schematic drawing of one preferred embodiment of the LED array.

We claim:

1. A wireless communications system for classroom use, comprising:
   (a) a portable transmitter for transmitting an infrared pulse position modulated signal;
   (b) a receiver for receiving said infrared pulse position modulated signal and converting said infrared pulse position modulated signal into an output electrical signal, wherein said receiver further comprises:
      (i) a master receiver for receiving said infrared pulse position modulated signal when a direct line of sight exists between said transmitter and said master receiver, wherein said master receiver further comprises:
         (1) at least one photodiode for receiving said infrared pulse position modulated signal and producing an electrical pulse position modulated signal;
         (2) a high gain pre-amplifier receiving said electrical pulse position modulated signal and producing an amplified modulated signal;
         (3) a high pass filter/amplifier receiving said amplified modulated signal and producing a filtered signal;
         (4) an amplifier receiving said filtered signal and producing an amplified signal;
         (5) a demodulator receiving said amplified signal and producing a demodulated signal;
         (6) a low pass filter/de-emphasizer receiving said demodulated signal and producing a filtered/de-emphasized signal;
         (7) a charge pump receiving said amplified signal of said amplifier and producing a rectifier voltage signal;
         (8) a comparator receiving said rectifier voltage signal and a reference voltage and producing at least one control signal;

(9) at least two gates receiving said at least one control signal, said filtered/de-emphasized signal and a signal from a slave receiver and producing an input signal;
(10) a speech processor receiving said input signal and producing an output signal;
(11) a mixer/audio amplifier receiving said output signal and producing an audio output signal; and
(12) at least one audio power amplifier receiving said audio output signal and producing at least one speaker driving output signal; and
(ii) said slave receiver for receiving said infrared pulse position modulated signal when a direct line of sight does not exist between said transmitter and said master receiver; and
(c) a speaker system for receiving said output electrical signal from said receiver and converting said output electrical signal to audible sound.

2. A wireless communications system for classroom use, comprising:
(a) a portable transmitter for transmitting an infrared pulse position modulated signal;
(b) a receiver for receiving said infrared pulse position modulated signal and converting said infrared pulse position modulated signal into an output electrical signal wherein said receiver further comprises:
(i) a master receiver for receiving said infrared pulse position modulated signal when a direct line of sight exists between said transmitter and said master receiver; and
(ii) a slave receiver for receiving said infrared pulse position modulated signal when a direct line of sight does not exist between said transmitter and said master receiver wherein said slave receiver further comprises:
(1) at least one photodiode for receiving said infrared pulse position modulated signal and producing an electrical pulse position modulated signal;
(2) a high gain pre-amplifier receiving said electrical pulse position modulated signal and producing an amplified modulated signal;
(3) a high pass filter/amplifier receiving said amplified modulated signal and producing a filtered signal;
(4) an amplifier receiving said filtered signal and producing an amplified signal;
(5) a demodulator receiving said amplified signal and producing a demodulated signal;
(6) a low pass filter/de-emphasizer receiving said demodulated signal and producing a filtered/de-emphasized signal;
(7) a charge pump receiving said amplified signal of said amplifier and producing a rectifier voltage signal;
(8) a comparator receiving said rectifier voltage signal and a reference voltage and producing at least one control signal; and
(9) a gate receiving said at least one control signal, and said filtered/de-emphasized signal, and producing an input signal for said master receiver; and
(c) a speaker system for receiving said output electrical signal from said receiver and converting said output electrical signal to audible sound.

3. A wireless communications system for classroom use, comprising:
(a) a portable transmitter for transmitting an infrared pulse position modulated signal, wherein said portable transmitter further comprises:
(i) a battery pack device to provide portable energy to operate said transmitter;
(ii) a necklace device suitable for wearing around the neck of a user, said necklace device having incorporated on its surface at least one infrared light emitting diode;
(iii) a microphone device attached to said necklace device to convert audible sound to an input electrical signal;
(iv) a pre-amplifier receiving said input electrical signal and amplifying said input electrical signal, received from said microphone device, into a pre-amplified signal;
(v) a speech processor receiving said pre-amplified signal and compressing said pre-amplified signal into a compressed audio signal, wherein said speech processor further comprises:
(1) a voltage controlled amplifier receiving said pre-amplified signal and producing an amplified audio signal;
(2) an amplifier and response control circuit receiving said amplified audio signal and producing said compressed audio signal;
(3) an amplifier receiving said pre-amplified signal and producing a pre-rectified signal; and
(4) a rectifier receiving said pre-rectified signal and producing a control signal to control said voltage controlled amplifier;
(vi) a buffer receiving said compressed audio signal, modulating said compressed audio signal into a modulated audio signal;
(vii) a pulse generator receiving said modulated audio signal and producing an electrical pulse position modulated signal; and
(viii) said at least one infrared light emitting diode attached to said necklace, receiving said electrical pulse position modulated signal and producing said infrared pulse position modulated signal for transmission to a receiver;
(b) said receiver for receiving said infrared pulse position modulated signal and converting said infrared pulse position modulated signal into an output electrical signal; and
(c) a speaker system for receiving said output electrical signal from said receiver and converting said output electrical signal to audible sound.

4. A wireless communications system for classroom use, comprising:
(a) a portable transmitter for transmitting an infrared pulse position modulated signal;
(b) a receiver for receiving said infrared pulse position modulated signal and converting said infrared pulse position modulated signal into an output electrical signal, wherein said receiver further comprises:
(i) a master receiver for receiving said infrared pulse position modulated signal when a direct line of sight exists between said transmitter and said master receiver, wherein said master receiver further comprises:
(1) at least one photodiode for receiving said infrared pulse position modulated signal and producing an electrical pulse position modulated signal;
(2) a high gain pre-amplifier receiving said electrical pulse position modulated signal and producing an amplified modulated signal;
(3) a high pass filter/amplifier receiving said amplified modulated signal and producing a filtered signal;

(4) an amplifier receiving said filtered signal and producing an amplified signal;

(5) a demodulator receiving said amplified signal and producing a demodulated signal;

(6) a low pass filter/de-emphasizer receiving said demodulated signal and producing a filtered/de-emphasized signal;

(7) a charge pump receiving said amplified signal of said amplifier and producing a rectifier voltage signal;

(8) a comparator receiving said rectifier voltage signal and a reference voltage and producing at least one control signal;

(9) at least two gates receiving said at least one control signal, said filtered/de-emphasized signal and a signal from a slave receiver and producing an input signal;

(10) a speech processor receiving said input signal and producing an output signal, wherein said speech processor further comprises:

(a) a voltage controlled amplifier receiving said input signal and producing an amplified audio signal;

(b) an amplifier and response control circuit receiving said amplified audio signal and producing a decompressed audio signal;

(c) an amplifier receiving said input signal and producing an pre-rectified signal; and (d) a rectifier receiving said pre-rectified signal and producing a control signal to control said voltage controlled amplifier;

(11) a mixer/audio amplifier receiving said output signal of said speech processor and producing an audio output signal;

(12) at least one audio power amplifier receiving said audio output signal and producing at least one speaker driving output signal; and (ii) said slave receiver for receiving said infrared pulse position modulated signal when a direct line of sight does not exist between said transmitter and said master receiver; and (c) a speaker system for receiving said output electrical signal from said receiver and converting said output electrical signal to audible sound.

* * * * *